US009367164B2

United States Patent
Wu et al.

(10) Patent No.: US 9,367,164 B2
(45) Date of Patent: Jun. 14, 2016

(54) PIXEL CIRCUIT INTEGRATING THRESHOLD VOLTAGE COMPENSATION WITH TOUCH DETECTION, DRIVING METHOD THEREOF, AND ORGANIC LIGHT-EMITTING DISPLAY PANEL

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Bo Wu, Beijing (CN); Xiaojing Qi, Beijing (CN); Leisen Nie, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 34 days.

(21) Appl. No.: 14/355,461

(22) PCT Filed: Sep. 10, 2013

(86) PCT No.: PCT/CN2013/083202
§ 371 (c)(1),
(2) Date: Apr. 30, 2014

(87) PCT Pub. No.: WO2014/190636
PCT Pub. Date: Dec. 4, 2014

(65) Prior Publication Data
US 2015/0103037 A1   Apr. 16, 2015

(30) Foreign Application Priority Data

May 31, 2013 (CN) .......................... 2013 1 0214409

(51) Int. Cl.
*G06F 3/041* (2006.01)
*G06F 3/044* (2006.01)
*G09G 3/32* (2016.01)

(52) U.S. Cl.
CPC .............. *G06F 3/0412* (2013.01); *G06F 3/041* (2013.01); *G06F 3/044* (2013.01); *G09G 3/3233* (2013.01);
(Continued)

(58) Field of Classification Search
CPC ....... G06F 3/0412; G06F 3/044; G06F 3/041; G09G 3/3258; G09G 3/3233
See application file for complete search history.

(56) References Cited

U.S. PATENT DOCUMENTS 8,289,313 B2   10/2012   Lee et al.
2005/0007353 A1   1/2005   Smith et al.
(Continued)

FOREIGN PATENT DOCUMENTS

CN   1669067 A   9/2005
CN   101286298 A   10/2008
(Continued)

OTHER PUBLICATIONS

International Search Report mailed Jun. 3, 2014; PCT/CN2013/083202.
(Continued)

*Primary Examiner* — Temesgh Ghebretinsae
*Assistant Examiner* — Lisa Landis
(74) *Attorney, Agent, or Firm* — Ladas & Parry LLP

(57) ABSTRACT

Embodiments of the present disclosure provide a pixel circuit, a driving method thereof, an organic light-emitting display panel and a display device. The pixel circuit is provided with a touch sensing module, a driving transistor, a driving control module and a light-emitting module. The pixel circuit compensates for a threshold voltage of the driving transistor by a diode connection of the driving transistor and a discharging of a storage capacitor, so that a driving current of the driving transistor is independent of the threshold voltage of the driving transistor, and thus the driving currents of the OLEDs located at different positions on the organic light-emitting display panel are consistent, which can improve a brightness uniformity and a reliability of the display panel.

18 Claims, 6 Drawing Sheets

(52) U.S. Cl.
CPC ...... *G09G 3/3258* (2013.01); *G09G 2300/0439* (2013.01); *G09G 2300/0819* (2013.01); *G09G 2300/0842* (2013.01); *G09G 2310/0272* (2013.01); *G09G 2310/08* (2013.01); *G09G 2320/0233* (2013.01); *G09G 2320/045* (2013.01); *G09G 2320/0653* (2013.01); *G09G 2360/14* (2013.01)

(56) References Cited

U.S. PATENT DOCUMENTS

| | | | |
|---|---|---|---|
| 2009/0027310 A1* | 1/2009 | Kim | 345/76 |
| 2010/0164847 A1* | 7/2010 | Lee et al. | 345/77 |
| 2011/0001711 A1* | 1/2011 | Choi et al. | 345/173 |
| 2012/0061556 A1 | 3/2012 | Chan et al. | |

FOREIGN PATENT DOCUMENTS

| | | |
|---|---|---|
| CN | 101943974 A | 1/2011 |
| CN | 102402931 A | 4/2012 |
| CN | 203250518 U | 10/2013 |
| KR | 20090009387 A | 1/2009 |

OTHER PUBLICATIONS

First Chinese Office Action dated Oct. 22, 2014; Appln. No. 201310214409.9.

International Preliminary Report on Patentability issued Dec. 1, 2015; PCT/CN2013/083202.

* cited by examiner in an initializing phase, the first transistor T1, the seventh transistor T7 and the eighth transistor T8 are in the turned-on state, while the second transistor T2, the third transistor T3, the fourth transistor T4 and the fifth transistor T5 are in the turn-off state, the driving control module 11 controls the potential at the node A to be the voltage input from the input terminal for the second level signal ⟵51 in a touch detecting phase, the fifth transistor T5, the seventh transistor T7 and the eighth transistor T8 are in the turned-on state, while the first transistor T1, the second transistor T2, the third transistor T3 and the fourth transistor T4 are in the turn-off state, the driving control module 11 outputs the potential at the node A to the data line, so that a chip judges whether the touch screen is touched based on the potential at the node A at this time ⟵52

Fig.5

PIXEL CIRCUIT INTEGRATING THRESHOLD VOLTAGE COMPENSATION WITH TOUCH DETECTION, DRIVING METHOD THEREOF, AND ORGANIC LIGHT-EMITTING DISPLAY PANEL

TECHNICAL FIELD

The present disclosure relates to a field of organic light-emitting display, and particularly to a pixel circuit, a driving method thereof, an organic light-emitting display panel and a display device.

BACKGROUND

A touch screen/panel has gained more and more attentions in a consumer electronics product market. Recently, the touch screen has been widely applied to many portable electric components as an interface for human-computer interaction, such as a mobile phone, a notebook computer, a digital camera, etc. A touch screen technique may be classified into two types: an external type and an in-cell type. The external type touch screen, just as its name implies, refers to disposition of another touch apparatus on a display. The external type touch screen has been applied to many mobile application products widely, such as the mobile phone. However, the external type touch screen increases a cost of the touch display device, and also increases a thickness of the touch display device. These two defects of the external touch screen especially emerge when a size of the touch display device is larger and larger.

Currently, consumer electronics product, such as the mobile phone, a tablet computer and the like, requires a smaller volume, a thinner thickness and a lighter weight. The in-cell touch screen can satisfy these requirements well since it is integrated into the display panel.

In view of the display panel, an Active Matrix Organic Light Emitting Diode (AMOLED) display panel meets requirements in the characteristics for a display in a multimedia age, because the AMOLED display panel has advantages as follows: no limitations on an angle of view, a low manufacture cost, a high response speed (about hundreds times faster than that of the liquid crystal display), energy-saving, self-luminance, capable of being applied to a direct-current driving of the portable device, a large operational temperature range, a light weight, and it can be miniaturized and thinned with a hardware device, etc. Therefore, the AMOLED display has a great potential for development and is hopeful of being a next generation of a new planar display.

Considering the respective advantages of the in-cell touch screen and the AMOLED display panel, it has been a mainstream developing trend to integrate the in-cell touch screen and the AMOLED display panel in an arrangement.

How to realize an integration of a detection of touch signals on the touch screen and a driving of a pixel circuit becomes a technique problem to be solved urgently.

SUMMARY

Embodiments of the present disclosure provide a pixel circuit, a driving method thereof, an organic light-emitting display panel and a display device, which can compensate for a threshold voltage Vth of a driving transistor, so that a driving current of the driving transistor is independent of the threshold voltage Vth of the driving transistor and the consistency in currents can be achieved, thus a brightness uniformity and reliability of the display panel can be improved.

The embodiments of the present disclosure provide a pixel circuit comprising a driving transistor, a driving control module and a light-emitting module, wherein the driving transistor is connected with the driving control module and the light-emitting module, respectively;

the driving control module is connected with an input terminal for a first level signal, an input terminal for a second level signal, an input terminal for a first timing control signal, an input terminal for a second timing control signal, an input terminal for a third timing control signal, an input terminal for a second timing control signal of a previous stage of a pixel circuit, an input terminal for a second timing control signal of a next stage of a pixel circuit, the driving transistor and the light-emitting module, respectively, and is used for compensating for a threshold voltage of the driving transistor and controlling the driving transistor to drive the light-emitting module to emit light under controls of the timing control signals as input;

the light-emitting module is connected with the input terminal for the third timing control signal, the input terminal for the second level signal, the driving transistor and the driving control module, respectively, and is used for emitting light as driven by the driving transistor, under the control of the timing control signal as input.

Optionally, the pixel circuit further comprises a touch sensing module connected with the input terminal for the first level signal, the input terminal for the second timing control signal of the previous stage of the pixel circuit, the driving transistor and the driving control module, respectively, and used for detecting a touch signal on a touch screen under the control of the timing control signal as input.

Optionally, the touch sensing module comprises:

a sensing element and a seventh transistor;

a first terminal of the sensing element is connected with the input terminal for the first level signal, and a second terminal of the sensing element is connected with a source of the seventh transistor; and a gate of the seventh transistor is connected with the input terminal for the second timing control signal of the previous stage of the pixel circuit, and a drain of the seventh transistor is connected with a node A.

Optionally, the sensing element is a photodiode, the first terminal of the sensing element is a cathode of the photodiode, and the second terminal of the sensing element is an anode of the photodiode; or the sensing element is a touch capacitor, and the first terminal and the second terminal of the sensing element are two terminals of the touch capacitor respectively.

Optionally, the driving control module comprises:

A first transistor, a second transistor, a fourth transistor, a fifth transistor, an eighth transistor and a storage capacitor;

a source of the first transistor is connected with the input terminal for the second level signal, a gate of the first transistor is connected with the input terminal for the first timing control signal, and a drain of the first transistor is connected with the node A;

a source of the second transistor is connected with a drain of the eighth transistor, a drain of the driving transistor and the light-emitting module, respectively; a gate of the second transistor is connected with the input terminal for the second timing control signal of the next stage of the pixel circuit, and a drain of the second transistor is connected with the node A;

a source of the fourth transistor is connected with a first terminal of the storage capacitor and the input terminal for the first level signal, respectively; a gate of the fourth transistor is connected with the input terminal for the third timing control signal, and a drain of the fourth transistor is connected with a drain of the fifth transistor and a source of the driving transistor, respectively;

a source of the fifth transistor is connected with a data line, and a gate of the fifth transistor is connected with the input terminal for the second timing control signal;

a source of the eighth transistor is connected with the input terminal for the second level signal, and a gate of the eighth transistor is connected with the input terminal for the second timing control signal of the previous stage of the pixel circuit; and a second terminal of the storage capacitor is connected with the node A.

Optionally, the light-emitting module comprises:

a third transistor and an organic light-emitting diode;

a source of the third transistor is connected with the source of the second transistor, the drain of the driving transistor, the drain of the eighth transistor, respectively; a gate of the third transistor is connected with the input terminal for the third timing control signal, and a drain of the third transistor is connected with an anode of the organic light-emitting diode; and a cathode of the organic light-emitting diode is connected with the input terminal for the second level signal.

Optionally, the gate of the driving transistor is connected with the node A.

Optionally, all of the driving transistor, the first transistor, the second transistor, the third transistor, the fourth transistor, the fifth transistor, the seventh transistor and the eighth transistor are P-type transistors;

the input terminal for the first level signal is connected with a high level; and the input terminal for the second level signal is connected with a low level.

The embodiments of the present disclosure further provide a driving method for driving the pixel circuit according to the above embodiments of the present disclosure, comprising:

a resetting phase, wherein the first transistor, the fifth transistor and the eighth transistor are in a turn-on state, while the second transistor, the third transistor and the fourth transistor are in a turn-off state, the driving control module controls a potential at the node A to be reset to a voltage inputted from the input terminal for the second level signal;

a reset maintaining phase, wherein the first transistor, the second transistor and the fifth transistor are in the turned-on state, while the third transistor, the fourth transistor and the eighth transistor are in the turn-off state, the driving control module controls the potential at the node A to be maintained unchanged;

a compensating phase, wherein the second transistor and the fifth transistor are in the turn-on state, while the first transistor, the third transistor, the fourth transistor and the eighth transistor are in the turn-off state, the driving control module controls the potential at the node A to be a sum of a data voltage inputted from the data line and a threshold voltage of the driving transistor;

a buffering phase, wherein the second transistor is in the turn-on state, while the first transistor, the third transistor, the fourth transistor, the fifth transistor and the eighth transistor are in the turn-off state, the driving control module controls the potential at the node A to be maintained unchanged; and a light-emitting phase, wherein the third transistor and the fourth transistor are in the turn-on state, while the first transistor, the second transistor, the fifth transistor and the eighth transistor are in the turn-off state, the driving control module controls the driving transistor to drive the light-emitting module to emit light.

Optionally, before the resetting phase, the driving method further comprises:

an initializing phase, wherein the first transistor, the seventh transistor and the eighth transistor are in the turn-on state, while the second transistor, the third transistor, the fourth transistor and the fifth transistor are in the turn-off state, the driving control module controls the potential at the node A to be the voltage inputted from the input terminal for the second level signal;

a touch detecting phase, wherein the fifth transistor, the seventh transistor and the eighth transistor are in the turn-on state, while the first transistor, the second transistor, the third transistor and the fourth transistor are in the turn-off state, the driving control module outputs the potential at the node A to the data line, so that a chip judges whether the touch screen is touched based on the potential at the node A at this time;

wherein, the seventh transistor is in the turn-on state during the resetting phase, and is in the turn-off state from the reset maintaining phase to the light-emitting phase.

Optionally, in the resetting phase, the first timing control signal is at a low level, the second timing control signal of the previous stage of the pixel circuit is at a low level, the second timing control signal is at a low level, the second timing control signal of the next stage of the pixel circuit is at a high level, and the third timing control signal is at a high level;

in the reset maintaining phase, the first timing control signal is at the low level, the second timing control signal of the previous stage of the pixel circuit is at the high level, the second timing control signal is at the low level, the second timing control signal of the next stage of the pixel circuit is at the low level, and the third timing control signal is at the high level;

in the compensating phase, the first timing control signal is at the high level, the second timing control signal of the previous stage of the pixel circuit is at the high level, the second timing control signal is at the low level, the second timing control signal of the next stage of the pixel circuit is at the low level, and the third timing control signal is at the high level;

in the buffering phase, the first timing control signal is at the high level, the second timing control signal of the previous stage of the pixel circuit is at the high level, the second timing control signal is at the high level, the second timing control signal of the next stage of the pixel circuit is at the low level, and the third timing control signal is at the high level; and in the light-emitting phase, the first timing control signal is at the high level, the second timing control signal of the previous stage of the pixel circuit is at the high level, the second timing control signal is at the high level, the second timing control signal of the next stage of the pixel circuit is at the high level, and the third timing control signal is at the low level.

Optionally, in the initializing phase, the first timing control signal is at the low level, the second timing control signal of the previous stage of the pixel circuit is at the low level, the second timing control signal is at the high level, the second timing control signal of the next stage of the pixel circuit is at the high level, and the third timing control signal is at the high level; and in the touch detecting phase, the first timing control signal is at the high level, the second timing control signal of the previous stage of the pixel circuit is at the low level, the second timing control signal is at the low level, the second timing control signal of the next stage of the pixel circuit is at the high level and the third timing control signal is at the high level.

The embodiments of the present disclosure further provide an organic light-emitting display panel which can comprise the above pixel circuit according to the embodiments of the present disclosure.

The embodiments of the present disclosure further provide a display device which can comprise the above organic light-emitting display panel according to the embodiments of the present disclosure.

It can be seen from the above description that, in the pixel circuit, the driving method thereof, the organic light-emitting display panel and the display device according to the embodiments of the present disclosure, by configuring the touch sensing module, the driving transistor, the driving control module and the light-emitting module, the pixel circuit can compensate for the threshold voltage of the driving transistor by a diode connection of the driving transistor and a discharging of the storage capacitor, so that the driving current of the driving transistor is independent of the threshold voltage of the driving transistor, and thus the driving currents of the OLEDs located at different positions on the organic light-emitting display panel are consistent, which can improve a brightness uniformity and a reliability of the OLED display panel.

BRIEF DESCRIPTION OF THE DRAWINGS

FIG. 5 is a second exemplary flowchart illustrating a driving method for the pixel circuit according to an embodiment of the present disclosure.

DETAILED DESCRIPTION

Thereafter, in order to make the aims, solutions and advantages of embodiments of the present disclosure more clear, the technical solutions of the disclosure will be described clearly and completely in connection with the accompanying drawings of the embodiments of the present disclosure. Obviously the described embodiments are only some, but not all of the embodiments of the present disclosure. Any other embodiments obtained by those ordinary skilled in the art based on the embodiments of the present disclosure without paying any inventive labors should fall into a scope sought for protection in the present disclosure.

Unless otherwise defined, all phrases including technical or scientific terms used herein have the same meaning as commonly understood by one of ordinary skill in the art to which this invention belongs. It will be understood that, the phrases "first", "second", and other similar words may not be used to indicate any order, number or significance, but only to distinguish different components. Also, the words "a" or "one" and the like may not be used to express a limitation on number, but only to express an existence of at least one of listed items. The expressions "connected with" or "connected to" and the like are not limited to a physical or mechanical connection, but include an electrical connection, whether it is connected directly or indirectly. Phrases "up", "down", "left", "right" and the like are only used to indicate a relative position relationship, and the relative position relationship may be changed correspondingly when an absolute position relationship of an object is changed.

Figure 1:
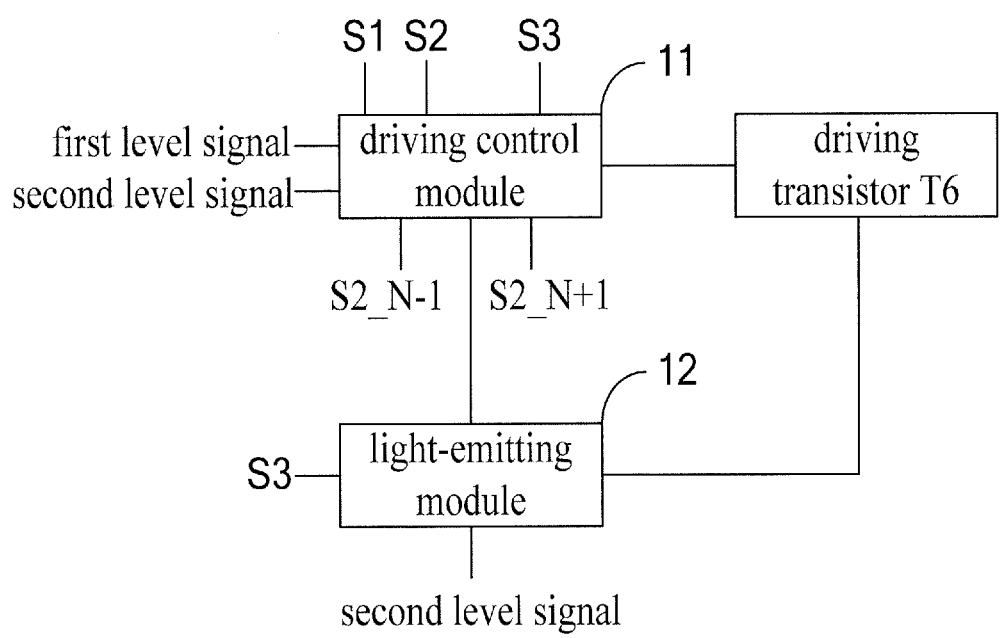
FIG. 1 is a first exemplary view illustrating a structure of a pixel circuit according to an embodiment of the present disclosure.

The embodiments of the present disclosure provide a pixel circuit, as illustrated in FIG. 1, in particularly, the pixel circuit can comprise:

a driving transistor T6, a driving control module 11 and a light-emitting module 12, wherein the driving transistor T6 can be connected with the driving control module 11 and the light-emitting module 12, respectively;

the driving control module 11 is connected with an input terminal for a first level signal, an input terminal for a second level signal, an input terminal for a first timing control signal S1, an input terminal for a second timing control signal S2, an input terminal for a third timing control signal S3, an input terminal for a second timing control signal S2_N−1 of a previous stage of a pixel circuit, an input terminal for a second timing control signal S2_N+1 of a next stage of a pixel circuit, the driving transistor T6 and the light-emitting module 12, respectively, and is used for compensating for a threshold voltage of the driving transistor T6 and controlling the driving transistor T6 to drive the light-emitting module 12 to emit light under controls of the timing control signals as input; and the light-emitting module 12 is connected with the input terminal for the third timing control signal S3, the input terminal for the second level signal, the driving transistor T6 and the driving control module 11, respectively, and is used for to be driven to emit light by the driving transistor T6, under the control of the timing control signal as input.

In the pixel circuit according to the embodiments of the present disclosure, a driving current of the driving transistor is independent of a threshold voltage Vth of the driving transistor, and thus the driving currents of the OLEDs located at different positions on an organic light-emitting display panel are consistent, which can improve a brightness uniformity and a reliability of the OLED display panel.

Figure 2:
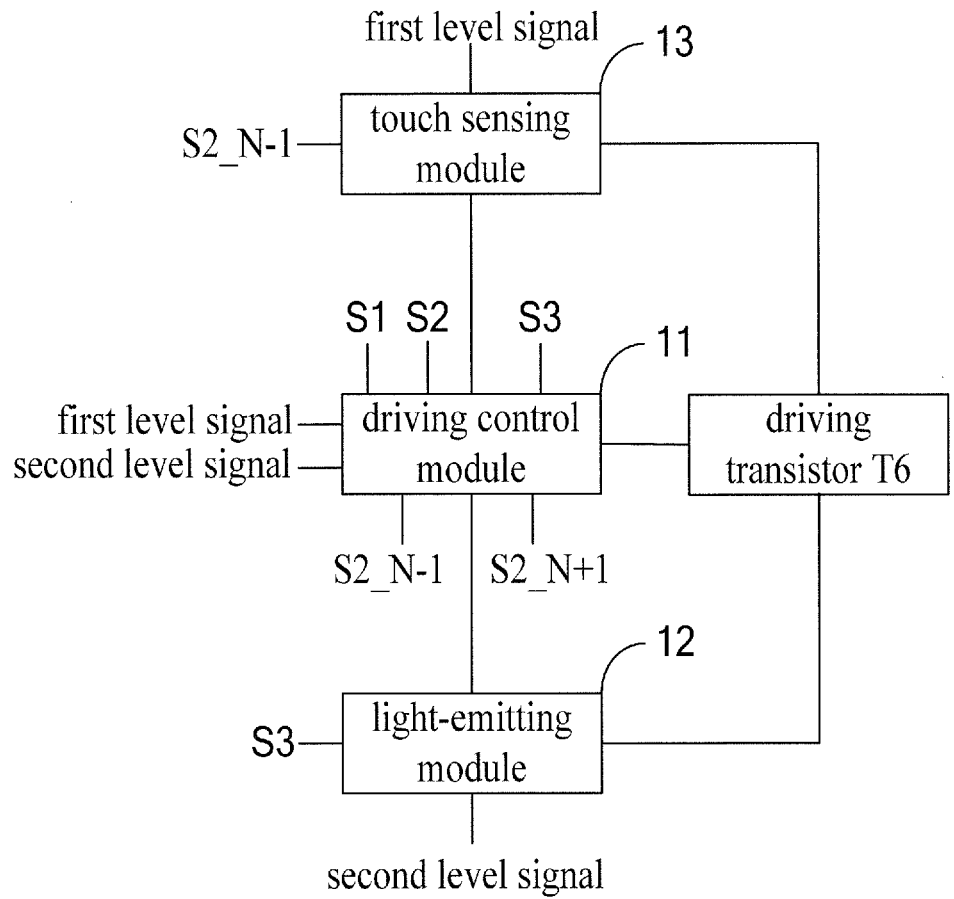
FIG. 2 is a second exemplary view illustrating a structure of a pixel circuit according to an embodiment of the present disclosure.

In a further specific embodiment of the present disclosure, as illustrated in FIG. 2, the pixel circuit according to the embodiment of the present disclosure can further comprise:

a touch sensing module 13 connected with the input terminal for the first level signal, the input terminal for the second timing control signal S2_N−1 of the previous stage of the pixel circuit, the driving transistor T6 and the driving control module 11, respectively, and used for detecting a touch signal on a touch screen under the timing control signal as input.

Figure 3:
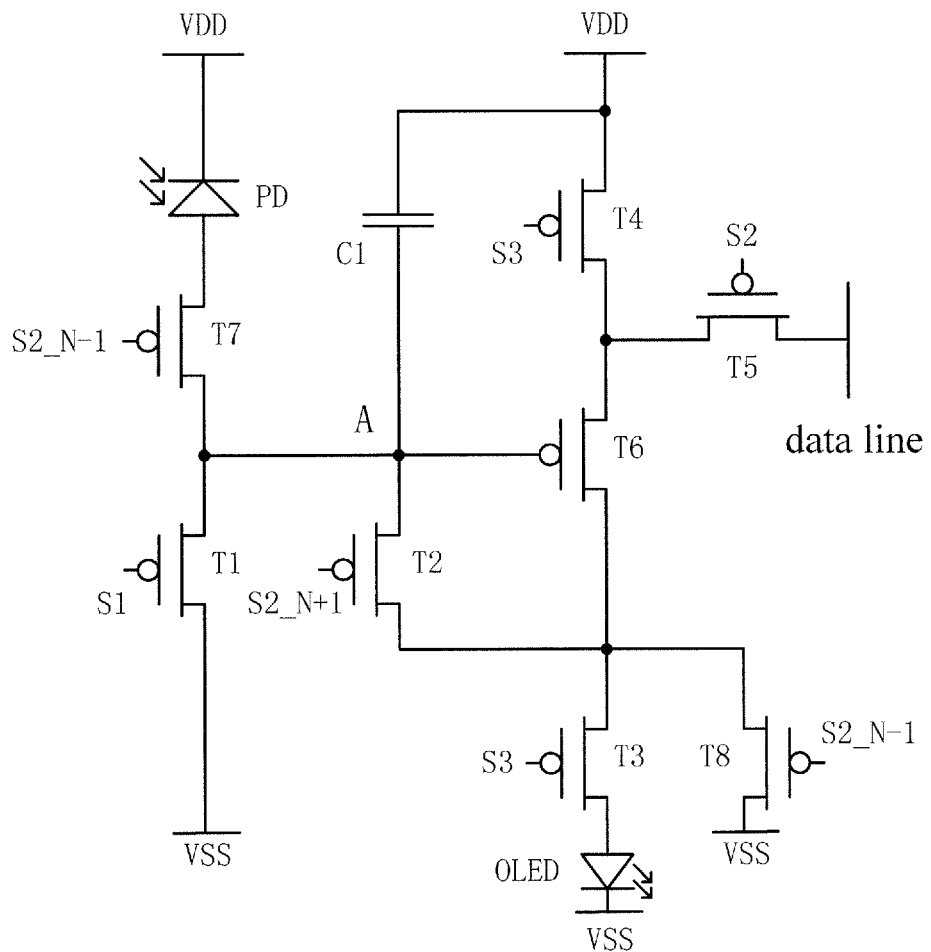
FIG. 3 is a third exemplary view illustrating a structure of a pixel circuit according to an embodiment of the present disclosure.

According to an embodiment, as illustrated in FIG. 3, the touch sensing module 13 comprises: a sensing element and a seventh transistor T7; wherein a first terminal of the sensing element is connected with the input terminal for the first level signal (for example, VDD), and a second terminal of the sensing element is connected with a source of the seventh transistor T7; and a gate of the seventh transistor is connected with the input terminal for the second timing control signal S2_N−1 of the previous stage of the pixel circuit, and a drain of the seventh transistor is connected with a node A.

According to an embodiment, the sensing element is a photodiode, the first terminal of the sensing element is a cathode of the photodiode, and the second terminal of the sensing element is an anode of the photodiode.

According to an embodiment, the sensing element is a touch capacitor, and the first terminal and the second terminal of the sensing element are two terminals of the touch capacitor respectively.

The touch signal detection circuit of the in-cell type touch screen can be integrated into a pixel unit provided by the embodiments of the present disclosure, and therefore an integrated disposition of the pixel driving circuit and the touch signal detection circuit is realized. Such a circuit configuration can achieve an integration of the in-cell type touch screen and the organic light-emitting diode driving display, which facilitates a decrease in the thickness and in the weight of the display panel and can in turn reduce the cost of the display panel.

In the embodiments of the present disclosure, the first timing control signal S1, the second timing control signal S2 and the third timing control signal S3 can be timing control signals of the present stage of the pixel circuit; particularly, the second timing control signal S2 is a timing control signal different from the second timing control signal S2_N−1 of the previous stage of the pixel circuit and the second timing control signal S2_N+1 of the next stage of the pixel circuit.

The first level signal mentioned in the embodiments of the present disclosure can be a direct-current high level signal VDD, or can also be other signals capable of inputting a high level periodically; while the second level signal mentioned in the embodiments of the present disclosure can be a direct-current low level signal VSS, or can also be other signals capable of inputting a low level periodically.

In an optional specific embodiment, as illustrated in FIG. 3, the driving control module 11 can comprises:
  a first transistor T1, a second transistor T2, a fourth transistor T4, a fifth transistor T5, an eighth transistor T8 and a storage capacitor C1;
  wherein a source of the first transistor T1 is connected with the input terminal for the second level signal (for example, VSS), a gate of the first transistor T1 is connected with the input terminal for the first timing control signal S1, and a drain of the first transistor T1 is connected with the node A;
  a source of the second transistor T2 is connected with a drain of the eighth transistor T8, a drain of the driving transistor T6 and the light-emitting module 12, respectively, a gate of the second transistor T2 is connected with the input terminal for the second timing control signal S2_N+1 of the next stage of the pixel circuit, and a drain of the second transistor T2 is connected with the node A;
  a source of the fourth transistor T4 is connected with a first terminal of the storage capacitor C1 and the input terminal for the first level signal, respectively, a gate of the fourth transistor T4 is connected with the input terminal for the third timing control signal S3, and a drain of the fourth transistor T4 is connected with a drain of the fifth transistor T5 and a source of the driving transistor T6, respectively;
  a source of the fifth transistor T5 is connected with a data line (the data line can also function as a touch signal read line), and a gate of the fifth transistor T5 is connected with the input terminal for the second timing control signal S2;
  a source of the eighth transistor T8 is connected with the input terminal for the second level signal, and a gate of the eighth transistor T8 is connected with the input terminal for the second timing control signal S2_N−1 of the previous stage of the pixel circuit; and
  a second terminal of the storage capacitor C1 is connected with the node A.

In an optional specific embodiment, as illustrated in FIG. 3, the light-emitting module 12 can further comprise:
  a third transistor T3 and an organic light-emitting diode OLED; wherein
  a source of the third transistor T3 is connected with the source of the second transistor T2, the drain of the driving transistor T6, and the drain of the eighth transistor T8, respectively, a gate of the third transistor T3 is connected with the input terminal for the third timing control signal S3, and a drain of the third transistor T3 is connected with an anode of the organic light-emitting diode OLED; and
  a cathode of the organic light-emitting diode OLED is connected with the input terminal for the second level signal.

In an optional specific embodiment, as illustrated in FIG. 3, the gate of the driving transistor T6 is connected with the node A.

In an optional specific embodiment, all of the driving transistor T6, the first transistor T1, the second transistor T2, the third transistor T3, the fourth transistor T4, the fifth transistor T5, the seventh transistor T7 and the eighth transistor T8 mentioned in the above embodiments of the present disclosure can be P-type transistors; and the source and the drain of the above transistor can be exchanged.

Figure 4:
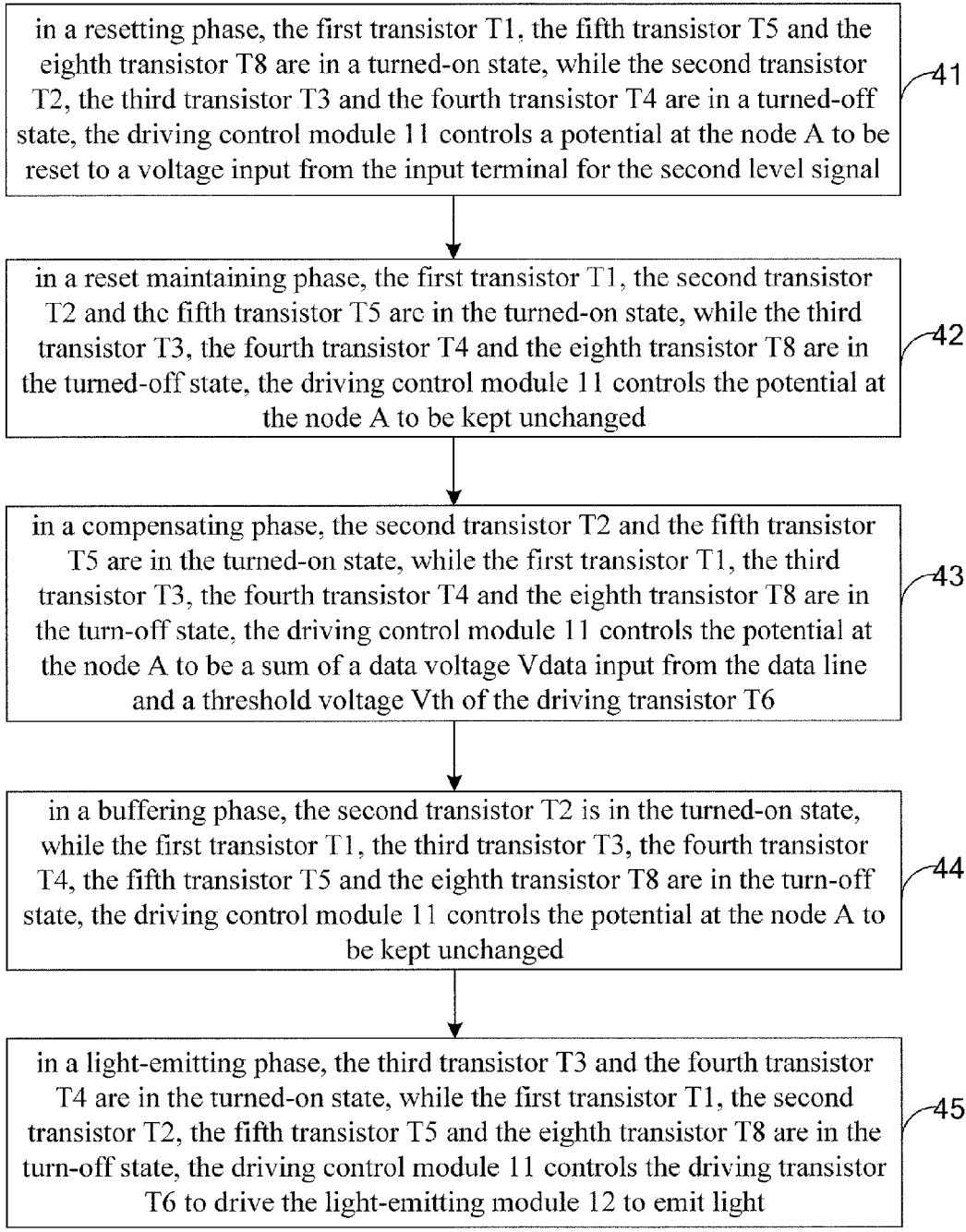
FIG. 4 is a first exemplary flowchart illustrating a driving method for the pixel circuit according to an embodiment of the present disclosure.

The embodiments of the present disclosure further provide a driving method for driving the pixel circuit according to the above embodiments of the present disclosure. As illustrated in FIG. 4, the driving method for the pixel circuit according to the embodiments of the present disclosure can comprise:
  step 41, in a resetting phase, the first transistor T1, the fifth transistor T5 and the eighth transistor T8 are in a turn-on state, while the second transistor T2, the third transistor T3 and the fourth transistor T4 are in a turn-off state, the driving control module 11 controls a potential at the node A to be reset to a voltage inputted from the input terminal for the second level signal;
  step 42, in a reset maintaining phase, the first transistor T1, the second transistor T2 and the fifth transistor T5 are in the turn-on state, while the third transistor T3, the fourth transistor T4 and the eighth transistor T8 are in the turn-off state, the driving control module 11 controls the potential at the node A to be maintained unchanged;
  step 43, in a compensating phase, the second transistor T2 and the fifth transistor T5 are in the turn-on state, while the first transistor T1, the third transistor T3, the fourth transistor T4 and the eighth transistor T8 are in the turn-off state, the driving control module 11 controls the potential at the node A to be a sum of a data voltage Vdata inputted from the data line and a threshold voltage Vth of the driving transistor T6;
  step 44, in a buffering phase, the second transistor T2 is in the turn-on state, while the first transistor T1, the third transistor T3, the fourth transistor T4, the fifth transistor T5 and the eighth transistor T8 are in the turn-off state, the driving control module 11 controls the potential at the node A to be maintained unchanged; and step 45, in a light-emitting phase, the third transistor T3 and the fourth transistor T4 are in the turn-on state, while the first transistor T1, the second transistor T2, the fifth transistor T5 and the eighth transistor T8 are in the turn-off state, the driving control module 11 controls the driving transistor T6 to drive the light-emitting module 12 to emit light.

In the driving method for the pixel circuit according to the embodiments of the present disclosure, the driving current of the driving transistor is independent of the threshold voltage Vth of the driving transistor, and thus the driving currents of the OLEDs located at different positions on the organic light-emitting display panel are consistent, which can improve the brightness uniformity and the reliability of the display panel.

In an optional specific embodiment according to the present disclosure, as illustrated in FIG. 5, before the resetting phase, the driving method for the pixel circuit according to the embodiments of the present disclosure can further comprise steps of:

a step 51, in an initializing phase, the first transistor T1, the seventh transistor T7 and the eighth transistor T8 are in the turn-on state, while the second transistor T2, the third transistor T3, the fourth transistor T4 and the fifth transistor T5 are in the turn-off state, the driving control module 11 controls the potential at the node A to be the voltage inputted from the input terminal for the second level signal; and a step 52, in a touch detecting phase, the fifth transistor T5, the seventh transistor T7 and the eighth transistor T8 are in the turn-on state, while the first transistor T1, the second transistor T2, the third transistor T3 and the fourth transistor T4 are in the turn-off state, the driving control module 11 outputs the potential at the node A to the data line, so that a chip determines whether the touch screen is touched based on the potential at the node A at this time.

That is to say, the driving method for the pixel circuit according to the embodiments of the present disclosure can further realize the detection of the touch signal.

It can be seen that, the driving method for the pixel circuit according to the embodiments of the present disclosure can mainly relate to two processes:

1. a process for detecting the touch screen signal; and
2. a process for compensating for the threshold voltage of the OLED and driving the pixel.

In a specific embodiment, a specific implementation of the driving method for the pixel circuit according to the embodiments of the present disclosure can perform the process for detecting the touch screen signal at first, and then perform the process for compensating for the threshold voltage of the OLED and driving the pixel.

Further, the execution order of the above two processes can be inverted.

Figure 6:
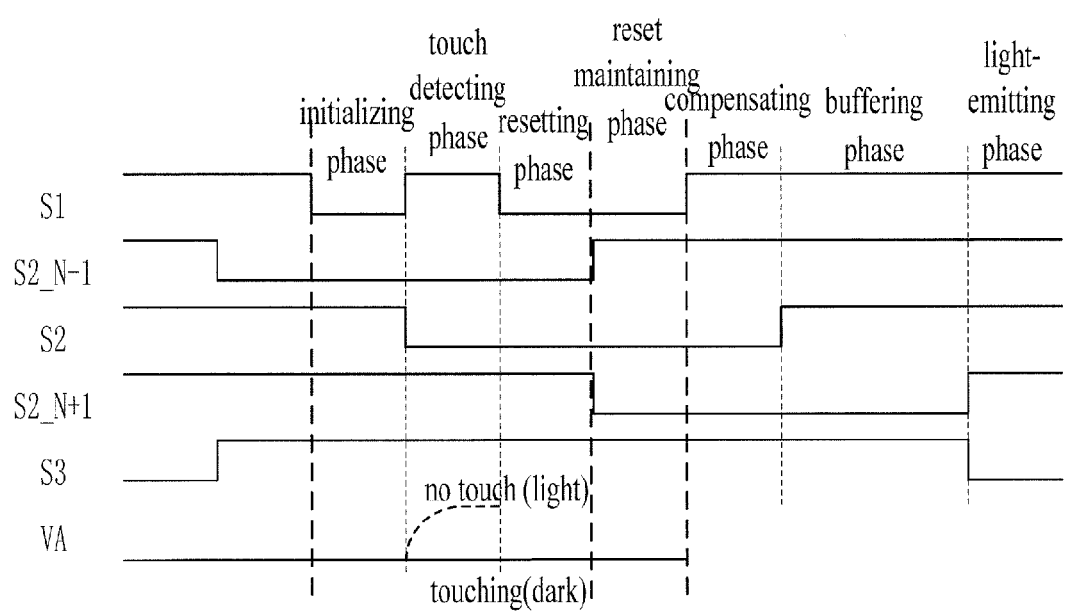
FIG. 6 is a timing diagram of driving signals for the pixel circuit according to the embodiments of the present disclosure.

A specific implementation of the driving method for the pixel circuit according to the embodiments of the present disclosure will be described below in connection with the timing diagram shown in FIG. 6.

In this embodiment, the first level signal is VDD, the second level signal is VSS, and the sensing element is a photodiode PD.

The specific implementation of the present embodiment can comprise processes as follows.

In the initializing phase, the first timing control signal S1 is at a low level, the second timing control signal S2_N−1 of the previous stage of the pixel circuit is at a low level, the second timing control signal S2 is at a high level, the second timing control signal S2_N+1 of the next stage of the pixel circuit is at a high level, and the third timing control signal S3 is at a high level. Accordingly during this phase, the first transistor T1, the seventh transistor T7 and the eighth transistor T8 are in the turn-on state, while the second transistor T2, the third transistor T3, the fourth transistor T4 and the fifth transistor T5 are in the turn-off state. Since the first transistor T1 is turned on, the node A is connected with VSS directly, and the potential at the node A $V_A$=VSS. At this time, a voltage across the capacitor C1 is $V_{C1}$=VDD−VSS.

In the touch detecting phase, the first timing control signal S1 is at the high level, the second timing control signal S2_N−1 of the previous stage of the pixel circuit is at the low level, the second timing control signal S2 is at the low level, the second timing control signal S2_N+1 of the next stage of the pixel circuit is at the high level and the third timing control signal S3 is at the high level. Accordingly during this phase, the fifth transistor T5, the seventh transistor T7 and the eighth transistor T8 are in the turn-on state, while the first transistor T1, the second transistor T2, the third transistor T3 and the fourth transistor T4 are in the turn-off state. At this time, the node A is connected with the photodiode PD via the seventh transistor T7. Since the leakage currents of the photodiode PD are different in a case of no touch (under the light radiation) and a case of being touched (under a shadow) (the leakage current of the photodiode PD under the light radiation is larger than that when there is no light radiation), a variation in the leakage currents of the photodiode PD in the case of no touch and in the case of being touched may lead to a change in the voltage at the node A. The change in the voltage at the node A is amplified by the fifth transistor T5 and then is transferred to an IC chip via a read line (particularly, can be the data line; in other words, the read line and the data line can be shared in the embodiments of the present disclosure) so as to be detected and analyzed, in order to determine whether the touch occurs at this position.

In the resetting phase, the first timing control signal S1 is at the low level, the second timing control signal S2_N−1 of the previous stage of the pixel circuit is at the low level, the second timing control signal S2 is at the low level, the second timing control signal S2_N+1 of the next stage of the pixel circuit is at the high level, and the third timing control signal S3 is at the high level. Accordingly during this phase, the first transistor T1, the fifth transistor T5, the seventh transistor T7 and the eighth transistor T8 are in a turn-on state, while the second transistor T2, the third transistor T3 and the fourth transistor T4 are in a turn-off state. At this time, the potential at the node A is reset to VSS, so an effect of the touch in the previous phase can be eliminated.

In the reset maintaining phase, the first timing control signal S1 is at the low level, the second timing control signal S2_N−1 of the previous stage of the pixel circuit is at the high level, the second timing control signal S2 is at the low level, the second timing control signal S2_N+1 of the next stage of the pixel circuit is at the low level, and the third timing control signal S3 is at the high level. Accordingly during this phase, the first transistor T1, the second transistor T2 and the fifth transistor T5 are in the turn-on state, while the third transistor T3, the fourth transistor T4, the seventh transistor T7 and the eighth transistor T8 are in the turn-off state. The potential at the node A is maintained to be reset to VSS, so the effect of the touch in the previous phase can be eliminated continually.

In the compensating phase, the first timing control signal S1 is at the high level, the second timing control signal S2_N−1 of the previous stage of the pixel circuit is at the high level, the second timing control signal S2 is at the low level, the second timing control signal S2_N+1 of the next stage of the pixel circuit is at the low level, and the third timing control signal S3 is at the high level. Accordingly during this phase, the second transistor T2 and the fifth transistor T5 are in the turn-on state, while the first transistor T1, the third transistor T3, the fourth transistor T4, the seventh transistor T7 and the eighth transistor T8 are in the turn-off state. The data voltage (Vdata) is written since the T5 is turned on. Since the second transistor T2 is in the turn-on state, the gate and drain of the driving transistor T6 are short-circuited at this time, the driving transistor T6 functions as a diode entering into a saturation state actually. A gate-source voltage of the driving transistor T6 Vgs=$V_A$−Vdata=Vth, so $V_A$=Vdata+Vth, and the voltage across the capacitor C1 $V_{C1}$=VDD−$V_A$=VDD−Vdata−Vth.

In the buffering phase, the first timing control signal S1 is at the high level, the second timing control signal S2_N−1 of the previous stage of the pixel circuit is at the high level, the second timing control signal S2 is at the high level, the second timing control signal S2_N+1 of the next stage of the pixel circuit is at the low level, and the third timing control signal S3 is at the high level. Accordingly during this phase, the second transistor T2 is in the turn-on state, while the first transistor T1, the third transistor T3, the fourth transistor T4, the fifth transistor T5, the seventh transistor T7 and the eighth transistor T8 are in the turn-off state. Because the source of the sixth transistor T6 is floating, no current path exists, and no charge is added or reduced at the node A according to an electric charge conservation law, and thus the voltage at the node A is maintained unchanged, that is, $V_A$=Vdata+Vth, and the voltage across the capacitor C1 is maintained as $V_{C1}$=VDD−$V_A$=VDD−Vdata−Vth.

In the light-emitting phase, the first timing control signal S1 is at the high level, the second timing control signal S2_N−1 of the previous stage of the pixel circuit is at the high level, the second timing control signal S2 is at the high level, the second timing control signal S2_N+1 of the next stage of the pixel circuit is at the high level, and the third timing control signal S3 is at the low level. Accordingly during this phase, the third transistor T3 and the fourth transistor T4 are in the turn-on state, while the first transistor T1, the second transistor T2, the fifth transistor T5, the seventh transistor T7 and the eighth transistor T8 are in the turn-off state. The driving control module 11 turns on the driving transistor T6 with the voltage across the capacitor C1, so that the OLED starts to emit light. Since the gate of the driving transistor T6 is connected with the second terminal of the capacitor C, namely the node A, directly, the gate-source voltage of the driving transistor T6 Vgs=$V_A$−VDD=Vdata+Vth−VDD, then a current flowing through the OLED $$I=K(Vgs-Vth)^2=K(Vdata+Vth-VDD-Vth)^2=K(Vdata-VDD)^2,$$

wherein K is a constant value related to the process and the driving design.

It can be seen that in the pixel circuit according to the embodiments of the present disclosure, the driving current of the OLED is independent of the threshold voltage Vth of the driving transistor under the controls of the timing signals, and thus the driving currents of the OLEDs located at different positions on the organic light-emitting display panel are consistent, which can improve the brightness uniformity and the reliability of the display panel.

Based on the pixel circuit according to the embodiments of the present disclosure, the embodiments of the present disclosure further provide an organic light-emitting display panel which can comprise the above pixel circuit according to the embodiments of the present disclosure.

The embodiments of the present disclosure further provide a display device which can comprise the above organic light-emitting display panel according to the embodiments of the present disclosure.

The display device can be, for example, a liquid crystal panel, a liquid crystal TV, a liquid crystal display, an OLED panel, an OLED display, a plasma display or a piece of electric paper and the like.

The pixel circuit, the organic light-emitting display panel and the display device according to the embodiments of the present disclosure are suitable to meet requirements for a GOA circuit made with a Low Temperature Poly-Silicon (LTPS) process, and are also suitable for a GOA circuit made with an amorphous silicon process.

It can be seen from the above description, in the pixel circuit, the driving method thereof, the organic light-emitting display panel and the display device according to the embodiments of the present disclosure, by configuring the touch sensing module, the driving transistor, the driving control module and the light-emitting module, the integration of the in-cell type touch screen and the driving display of the organic light-emitting diode is realized, which facilitates decrease in the thickness and the weight of the display panel and can in turn reduce the cost of the display panel. In particular, the touch sensing module is used to detect the touch signal occurring on the touch screen, the driving control module is used to control the driving transistor to drive the light-emitting module to emit light, according to the inputted timing control signals. Further, the pixel circuit compensates for the threshold voltage Vth of the driving transistor by a diode connection of the driving transistor and a discharging of the storage capacitor, so that the driving current of the driving transistor is independent of the threshold voltage Vth of the driving transistor, and thus the driving currents of the OLEDs located at different positions on the organic light-emitting display panel are consistent, which can improve a brightness uniformity and a reliability of the OLED display panel. Meanwhile, solutions provided by the embodiments of the present disclosure also have advantages of less control signals, a simple timing and a circuit which is easily realized.

It should be noted that, although the above embodiments are described by taking a case where all transistors are P-type thin film transistors as an example, the circuit described above can also be modified as a circuit with all N-type thin film transistors or CMOS transistors. Further, the part of the touch functions can be removed and the remaining part can be modified as a pure pixel light-emitting driving circuit. Also, although the above descriptions are made by taking the Active Matrix Organic Light-Emitting Diode as an example, the present disclosure can also be applied to the display device with other various light-emitting diodes, instead of being limited to the display device with the AMOLED.

The above only describes the embodiments of the present disclosure, and it should be noted that those skilled in the art may make modifications, variations and equivalences to the above embodiments without departing from the spirit and scope of the present disclosure. Such variations and modifications are intended to be included within the spirit and scope of the present disclosure.

What is claimed is:

1. A pixel circuit comprising a driving transistor, a driving control circuit and a light-emitting circuit, wherein
   the driving transistor is connected with the driving control circuit and the light-emitting circuit, respectively;
   the driving control circuit is connected with an input terminal for a first level signal, an input terminal for a second level signal, an input terminal for a first timing control signal, an input terminal for a second timing control signal, an input terminal for a third timing control signal, an input terminal for a second timing control signal of a previous stage of a pixel circuit, an input terminal for a second timing control signal of a next stage of a pixel circuit, the driving transistor and the light-emitting circuit, respectively, and is configured to compensate for a threshold voltage of the driving transistor and control the driving transistor to drive the light-emitting circuit to emit light under control of timing control signals as inputted; and the light-emitting circuit is connected with the input terminal for the third timing control signal, the input terminal for the second level signal, the driving transistor and the driving control circuit, respectively, and is configured to emit light as driven by the driving transistor, under the control of the inputted timing control signal;

wherein the pixel circuit further comprises a touch sensing circuit, wherein the touch sensing circuit is connected with the input terminal for the first level signal, the input terminal for the second timing control signal of the previous stage of the pixel circuit and a node A, and is configured to detect a touch signal on a touch screen under a control of the second timing control signal of the previous stage of the pixel circuit;

wherein the driving control circuit comprises a fifth transistor, wherein a drain of the fifth transistor is connected with a data line, and a gate of the fifth transistor is connected with the input terminal for the second timing control signal, a source of the fifth transistor is connected to the source of the driving transistor;

the fifth transistors is turned on during a touch detecting phase so as to transmit a voltage variation at the node A due to a touch on a touch screen to the data line, and is turned on during a compensating phase to write a data voltage to the source of the driving transistor.

2. The pixel circuit of claim 1, wherein the touch sensing circuit comprises:
a sensing element and a seventh transistor;
a first terminal of the sensing element is connected with the input terminal for the first level signal, and a second terminal of the sensing element is connected with a source of the seventh transistor; and
a gate of the seventh transistor is connected with the input terminal for the second timing control signal of the previous stage of the pixel circuit, and a drain of the seventh transistor is connected with the node A.

3. The pixel circuit of claim 1, wherein the sensing element is a photodiode, the first terminal of the sensing element is a cathode of the photodiode, and the second terminal of the sensing element is an anode of the photodiode; or
the sensing element is a touch capacitor, and the first terminal and the second terminal of the sensing element are two terminals of the touch capacitor respectively.

4. The pixel circuit of claim 2, wherein the driving control circuit further comprises:
a first transistor, a second transistor, a fourth transistor, an eighth transistor and a storage capacitor;
a source of the first transistor is connected with the input terminal for the second level signal, a gate of the first transistor is connected with the input terminal for the first timing control signal, and a drain of the first transistor is connected with the node A;
a source of the second transistor is connected with a drain of the eighth transistor, a drain of the driving transistor and the light-emitting circuit, respectively; a gate of the second transistor is connected with the input terminal for the second timing control signal of the next stage of the pixel circuit, and a drain of the second transistor is connected with the node A;

a source of the fourth transistor is connected with a first terminal of the storage capacitor and the input terminal for the first level signal, respectively; a gate of the fourth transistor is connected with the input terminal for the third timing control signal, and a drain of the fourth transistor is connected with a drain of the fifth transistor and a source of the driving transistor, respectively;

a source of the eighth transistor is connected with the input terminal for the second level signal, and a gate of the eighth transistor is connected with the input terminal for the second timing control signal of the previous stage of the pixel circuit; and a second terminal of the storage capacitor is connected with the node A.

5. The pixel circuit of claim 4, wherein the light-emitting circuit comprises:
a third transistor and an organic light-emitting diode;
a source of the third transistor is connected with the source of the second transistor, the drain of the driving transistor, the drain of the eighth transistor, respectively, a gate of the third transistor is connected with the input terminal for the third timing control signal, and a drain of the third transistor is connected with an anode of the organic light-emitting diode; and
a cathode of the organic light-emitting diode is connected with the input terminal for the second level signal.

6. The pixel circuit of claim 5, wherein the gate of the driving transistor is connected with the node A.

7. The pixel circuit of claim 6, wherein all of the driving transistor, the first transistor, the second transistor, the third transistor, the fourth transistor, the fifth transistor, the seventh transistor and the eighth transistor are P-type transistors;
the input terminal for the first level signal is connected with a high level; and
the input terminal for the second level signal is connected with a low level.

8. A driving method for driving a pixel circuit comprising a driving transistor, a driving control circuit, a light-emitting circuit and a touch sensing circuit, wherein the driving control circuit comprises a first transistor, a second transistor, a fourth transistor, a fifth transistor, an eighth transistor and a storage capacitor;
wherein a drain of the first transistor is connected with an input terminal for a second level signal, a gate of the first transistor is connected with an input terminal for a first timing control signal, and a source of the first transistor is connected with a node A;
a gate of the driving transistor is connected to the node A;
a source of the second transistor is connected with the node A, a gate of the second transistor is connected with an input terminal for a second timing control signal of a next stage of the pixel circuit, and a drain of the second transistor is connected with the drain of the driving transistor;
a source of the fourth transistor is connected with an input terminal for a first level signal, a gate of the fourth transistor is connected with an input terminal for a third timing control signal, and a drain of the fourth transistor is connected with a source of the driving transistor;
a drain of the fifth transistor is connected with a data line, and a gate of the fifth transistor is connected with an input terminal for a second timing control signal, and a source of the fifth transistor is connected to the source of the driving transistor;

a source of the eighth transistor is connected with the drain of the driving transistor, a gate the eighth transistor is connected with an input terminal for a second timing control signal of a previous stage of the pixel circuit, and the drain of the eighth transistor is connected to the input terminal for the second level signal;

a first terminal of the storage capacitor is connected with the node A, and a second terminal of the storage capacitor is connected with the input terminal for the first level signal;

wherein the light-emitting circuit comprises a third transistor and an organic light-emitting diode, wherein a source of the third transistor is connected with the drain of the driving transistor, a gate of the third transistor is connected with the input terminal for the third timing control signal, and a drain of the third transistor is connected with an anode of the organic light-emitting diode; and a cathode of the organic light-emitting diode is connected with the input terminal for the second level signal;

the touch sensing circuit comprises a sensing element and a seventh transistor, wherein a first terminal of the sensing element is connected with the input terminal for the first level signal, and a second terminal of the sensing element is connected with a source of the seventh transistor; and a gate of the seventh transistor is connected with the input terminal for the second timing control signal of the previous stage of the pixel circuit, and a drain of the seventh transistor is connected with the node A;

wherein the driving method comprises:

a resetting phase, wherein the first transistor, the fifth transistor and the eighth transistor are in a turn-on state, while the second transistor, the third transistor and the fourth transistor are in a turn-off state, the driving control circuit controls a potential at the node A to be reset to a voltage inputted from the input terminal for the second level signal;

a reset maintaining phase, wherein the first transistor, the second transistor and the fifth transistor are in the turn-on state, while the third transistor, the fourth transistor and the eighth transistor are in the turn-off state, the driving control circuit controls the potential at the node A to be maintained unchanged;

a compensating phase, wherein the second transistor and the fifth transistor are in the turn-on state, while the first transistor, the third transistor, the fourth transistor and the eighth transistor are in the turn-off state, the driving control circuit controls the potential at the node A to be a sum of a data voltage inputted from the data line and a threshold voltage of the driving transistor;

a buffering phase, wherein the second transistor is in the turn-on state, while the first transistor, the third transistor, the fourth transistor, the fifth transistor and the eighth transistor are in the turn-off state, the driving control circuit controls the potential at the node A to be maintained unchanged; and a light-emitting phase, wherein the third transistor and the fourth transistor are in the turn-on state, while the first transistor, the second transistor, the fifth transistor and the eighth transistor are in the turn-off state, the driving control circuit controls the driving transistor to drive the light-emitting circuit to emit light.

9. The driving method of claim 8, wherein, before the resetting phase, the driving method further comprises:

an initializing phase, wherein the first transistor, the seventh transistor and the eighth transistor are in the turn-on state, while the second transistor, the third transistor, the fourth transistor and the fifth transistor are in the turn-off state, the driving control circuit controls the potential at the node A to be the voltage inputted from the input terminal for the second level signal;

a touch detecting phase, wherein the fifth transistor, the seventh transistor and the eighth transistor are in the turn-on state, while the first transistor, the second transistor, the third transistor and the fourth transistor are in the turn-off state, the driving control circuit outputs the potential at the node A to the data line, so as to judge whether a touch occurs on a touch screen based on the potential at the node A at this time; and during the resetting phase, the seventh transistor is in the turn-on state, and from the reset maintaining phase to the light-emitting phase the seventh transistor is in the turn-off state.

10. The driving method of claim 9, wherein in the resetting phase, the first timing control signal is at a low level, the second timing control signal of the previous stage of the pixel circuit is at the low level, the second timing control signal is at the low level, the second timing control signal of the next stage of the pixel circuit is at a high level, and the third timing control signal is at the high level;

in the reset maintaining phase, the first timing control signal is at the low level, the second timing control signal of the previous stage of the pixel circuit is at the high level, the second timing control signal is at the low level, the second timing control signal of the next stage of the pixel circuit is at the low level, and the third timing control signal is at the high level;

in the compensating phase, the first timing control signal is at the high level, the second timing control signal of the previous stage of the pixel circuit is at the high level, the second timing control signal is at the low level, the second timing control signal of the next stage of the pixel circuit is at the low level, and the third timing control signal is at the high level;

in the buffering phase, the first timing control signal is at the high level, the second timing control signal of the previous stage of the pixel circuit is at the high level, the second timing control signal is at the high level, the second timing control signal of the next stage of the pixel circuit is at the low level, and the third timing control signal is at the high level; and in the light-emitting phase, the first timing control signal is at the high level, the second timing control signal of the previous stage of the pixel circuit is at the high level, the second timing control signal is at the high level, the second timing control signal of the next stage of the pixel circuit is at the high level, and the third timing control signal is at the low level.

11. The driving method of claim 10, wherein in the initializing phase, the first timing control signal is at the low level, the second timing control signal of the previous stage of the pixel circuit is at the low level, the second timing control signal is at the high level, the second timing control signal of the next stage of the pixel circuit is at the high level, and the third timing control signal is at the high level; and in the touch detecting phase, the first timing control signal is at the high level, the second timing control signal of the previous stage of the pixel circuit is at the low level, the second timing control signal is at the low level, the second timing control signal of the next stage of the pixel circuit is at the high level and the third timing control signal is at the high level.

12. An organic light-emitting display panel comprising the pixel circuit of claim 1.

13. The organic light-emitting display panel of claim 12, wherein the touch sensing circuit comprises:
   a sensing element and a seventh transistor;
   a first terminal of the sensing element is connected with the input terminal for the first level signal, and a second terminal of the sensing element is connected with a source of the seventh transistor; and
   a gate of the seventh transistor is connected with the input terminal for the second timing control signal of the previous stage of the pixel circuit, and a drain of the seventh transistor is connected with the node A.

14. The organic light-emitting display panel of claim 13, wherein the sensing element is a photodiode, the first terminal of the sensing element is a cathode of the photodiode, and the second terminal of the sensing element is an anode of the photodiode; or
   the sensing element is a touch capacitor, and the first terminal and the second terminal of the sensing element are two terminals of the touch capacitor respectively.

15. The organic light-emitting display panel of claim 13, wherein the driving control circuit further comprises:
   a first transistor, a second transistor, a fourth transistor, an eighth transistor and a storage capacitor;
   a source of the first transistor is connected with the input terminal for the second level signal, a gate of the first transistor is connected with the input terminal for the first timing control signal, and a drain of the first transistor turn-on is connected with the node A;
   a source of the second transistor is connected with a drain of the eighth transistor, a drain of the driving transistor and the light-emitting circuit, respectively; a gate of the second transistor is connected with the input terminal for the second timing control signal of the next stage of the pixel circuit, and a drain of the second transistor is connected with the node A;
   a source of the fourth transistor is connected with a first terminal of the storage capacitor and the input terminal for the first level signal, respectively; a gate of the fourth transistor is connected with the input terminal for the third timing control signal, and a drain of the fourth transistor is connected with a drain of the fifth transistor and a source of the driving transistor, respectively;
   a source of the eighth transistor is connected with the input terminal for the second level signal, and a gate of the eighth transistor is connected with the input terminal for the second timing control signal of the previous stage of the pixel circuit; and
   a second terminal of the storage capacitor is connected with the node A.

16. The organic light-emitting display panel of claim 15, wherein the light-emitting circuit comprises:
   a third transistor and an organic light-emitting diode;
   a source of the third transistor is connected with the source of the second transistor, the drain of the driving transistor, the drain of the eighth transistor, respectively, a gate of the third transistor is connected with the input terminal for the third timing control signal, and a drain of the third transistor is connected with an anode of the organic light-emitting diode; and
   a cathode of the organic light-emitting diode is connected with the input terminal for the second level signal.

17. The organic light-emitting display panel of claim 16, wherein the gate of the driving transistor is connected with the node A.

18. The organic light-emitting display panel of claim 17, wherein all of the driving transistor, the first transistor, the second transistor, the third transistor, the fourth transistor, the fifth transistor, the seventh transistor and the eighth transistor are P-type transistors;
   the input terminal for the first level signal is connected with a high level; and
   the input terminal for the second level signal is connected with a low level.

\* \* \* \* \*